United States Patent [19]

Jourdan et al.

[11] 4,028,544
[45] June 7, 1977

[54] RADIANT ENERGY DETECTION SYSTEM

[75] Inventors: Francis Jourdan; Georges Couderc; Serge Ediar, all of Paris, France

[73] Assignee: Thomson-CSF, Paris, France

[22] Filed: Apr. 5, 1976

[21] Appl. No.: 673,818

[30] Foreign Application Priority Data

Apr. 7, 1975   France .............................. 75.10741

[52] U.S. Cl. ........................... 250/203 R; 244/3.16; 250/237 R
[51] Int. Cl.² ........................................... G01J 1/20
[58] Field of Search ............... 250/203 R, 237, 208, 250/209; 356/141, 152, 28, 29; 244/3.16, 3.17

[56] References Cited

UNITED STATES PATENTS

| | | | |
|---|---|---|---|
| 3,100,264 | 8/1963 | Jaffe et al. | 250/203 R |
| 3,356,849 | 12/1967 | Whitney | 250/203 R |
| 3,950,099 | 4/1976 | Malueg | 356/152 |

*Primary Examiner*—David C. Nelms
*Attorney, Agent, or Firm*—Oblon, Fisher, Spivak, McClelland & Maier

[57] ABSTRACT

A radiant energy detection system for discriminating between radiation from a target and ambient radiation wherein optical receiver means is arranged to produce two images of the observed field which are staggered along the direction of displacement of modulating grids by an amount substantially equal to the diameter of the target image, and which includes filtering means and attenuating means to balance the radiation levels in the case of ambient background radiation.

9 Claims, 16 Drawing Figures

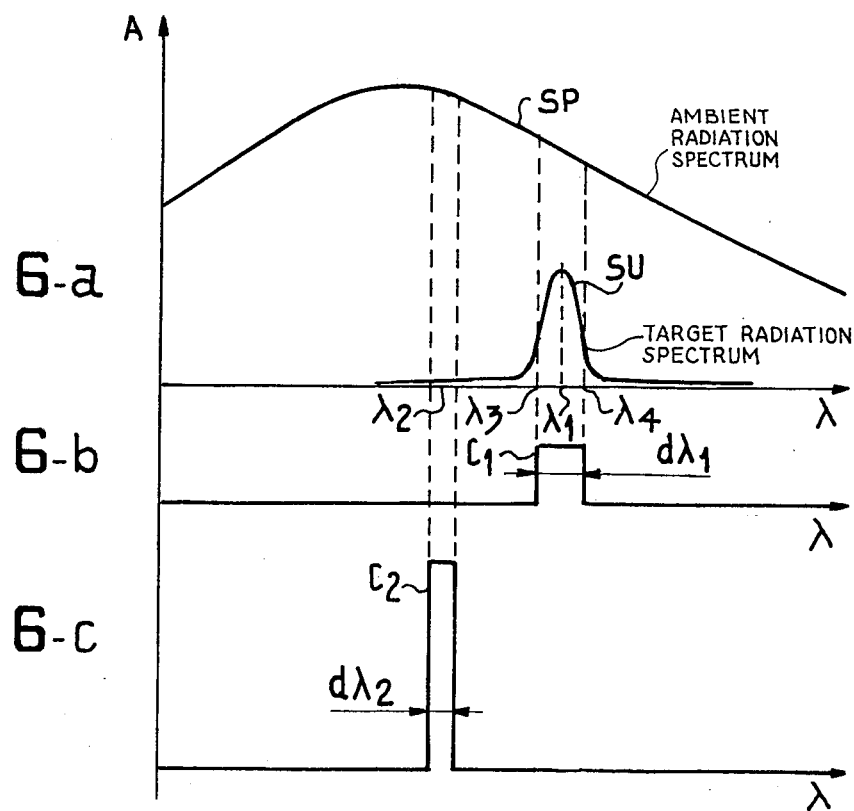

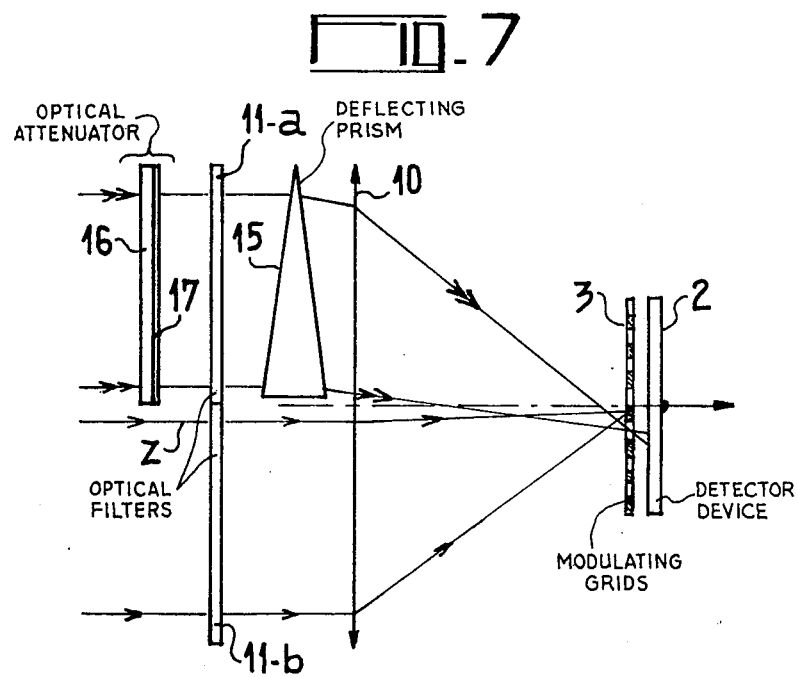
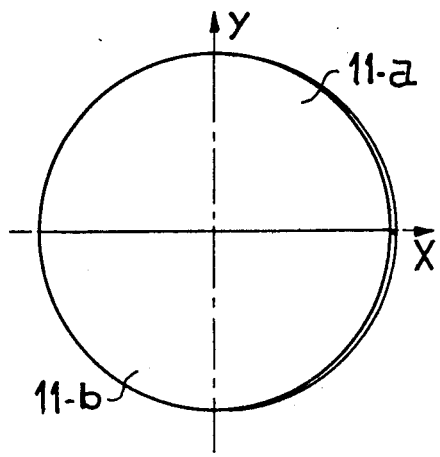
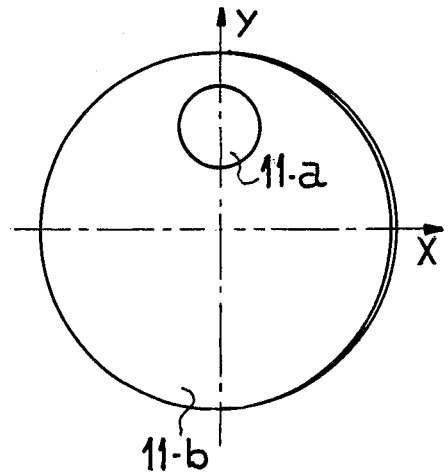

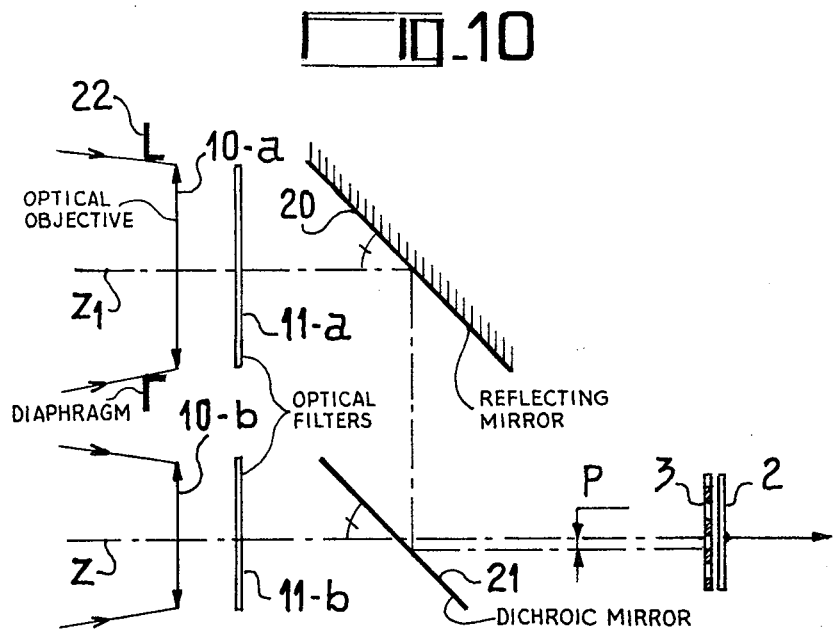
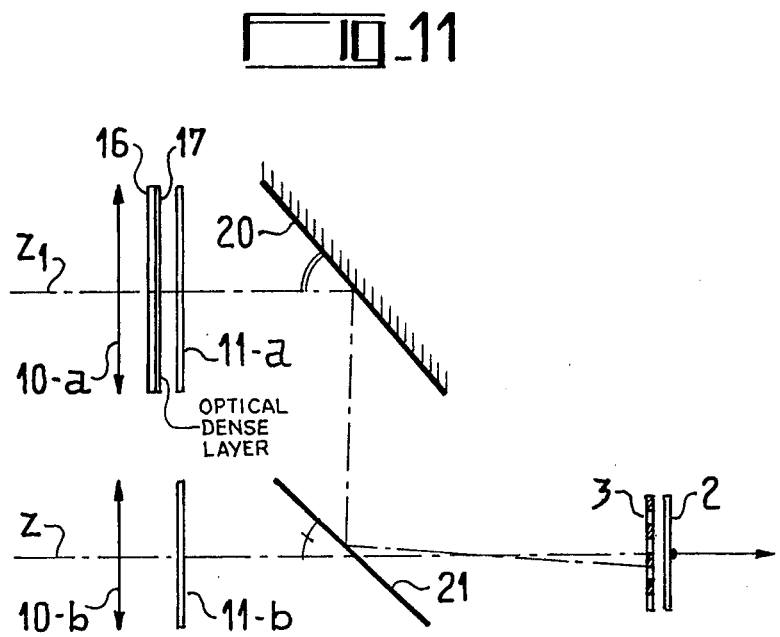

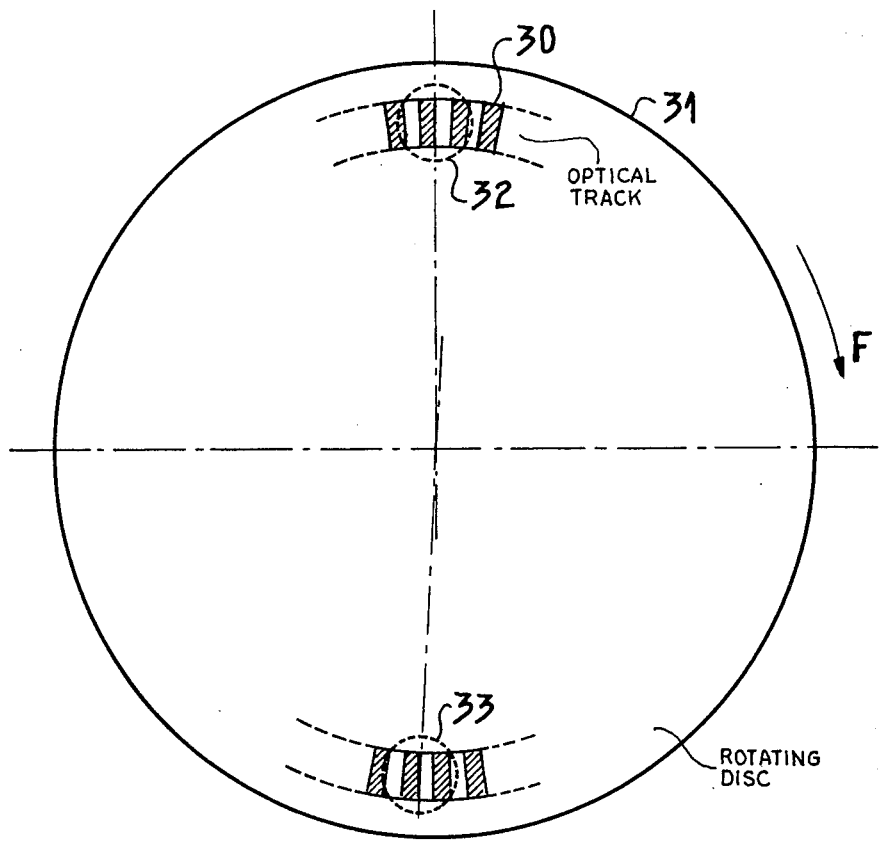
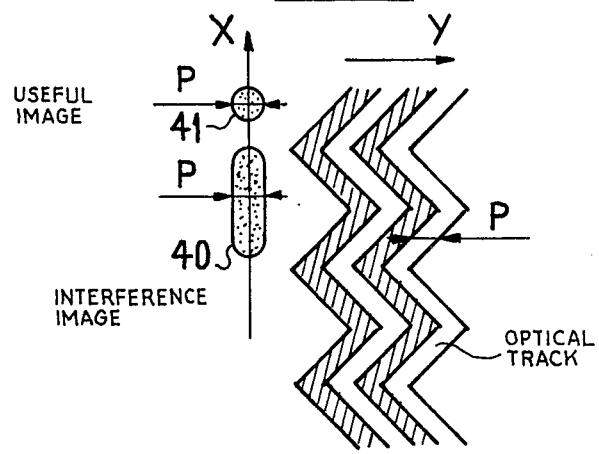

RADIANT ENERGY DETECTION SYSTEM

This present invention relates to a radiant energy detection system and is applicable more particularly to electro-optical direction finders which receive light rays from an observed field. The received light radiation contains sought after radiation which is termed useful radiation, such as that provided or reflected from a target included in the observed field. In such systems the received radiation contains in addition ambient unwanted radiation which arrives directly or by reflection from interference light sources. The unwanted radiation or background radiation is liable to be detected and processed by the receiver in the same way as useful radiation unless precautions are taken to discriminate between them.

The useful radiation is generally distinguishable by, in particular, its spectral and physical characteristics, that is to say, on the one hand, that it lies within the waveband envisaged for operations and, on the other hand, that the image of the useful object in question, which is formed by an optical input system in the receiver on the photosensitive surface of a detector, has specific dimensional characteristics.

The sources responsible for the ambient radiation which produces noise signals, as it is known in contrast to the useful signal, may be of various kinds. In the context of daytime operation, they include in particular the strong ambient radiation which comes either directly or by reflection from the sun. The spectral and spatial characteristics of interference sources are generally very different from those of the useful object.

It is known to undertake a spectral filtering operation on the received radiation so as to eliminate radiation situated outside the operating waveband, which latter is generally kept narrow. The spectral filtering may be effected by means of optical filters inserted in the optical path.

It is also known to modulate the incident radiation by means of grids also called reticles containing zones some of which are opaque and others of which are transparent and whose shape and dimensions differ but are most closely matched to the shape of the useful image so as to provide suitable spatial filtering. The grids and the image are moved relative to one another, either by traversing the grids across the fixed image of the filed or conversely by moving the image of the field by shifting the axis of the field, the grids being fixed. This relative movement produces a predetermined modulation of the detected signals and the receiver circuit downstream of the detector contains a suitable processing circuit to undertake a time-based filtering operation matched to the temporal characteristics of the useful signals. The matched filtering may be put into effect by means of selective amplifiers or by means of correlators.

In such systems the major proportion of the background signals can be removed in this way. However, interference radiation which arrives at the image plane and produces an image which has the same dimensional characteristics as those of the useful image is likely to be detected in the same way as a useful signal.

It is an object of the present invention to provide a radiant energy detection system which enables the above disadvantage to be overcome so that virtually all mis-detection which may result from various types of ambient radiation can be eliminated.

In accordance with the invention, there is provided a radiant energy detection system for discriminating between radiation from a target and ambient radiation, combining: optical receiver means comprising an optical objective for focusing the radiation originating from an observed field, an optical splitter device for producing two optical channels, a first optical filter in a first of said channels having a pass-band corresponding substantially to the said target radiation spectrum, a second optical filter in the second of said channels having a pass-band corresponding to a portion of the said ambient radiation spectrum and outside the target spectrum and optical attenuating means for balancing the ambient radiation levels in the two channels; reticle means for modulating the focused radiation by means of grids comprising, in a plane, transparent zones separated by opaque zones, said grids being moved substantially in the focal plane of said optical objective in a direction transverse to that of the optical axis of said objective; photodetection means behind said reticle means for detecting the modulated and filtered radiation and a circuit for processing the detected signals; the said optical splitter device producing in combination with said objective two images of the said field, one for each channel, which are staggered in the plane of the grids in the said direction by an amount substantially equal to the diameter of the target image, the dimension of the said zones in this direction being a multiple of and at least equal to this diameter.

The invention will now be further described with reference to the accompanying drawings in which:

FIG. 6 shows waveforms relating to the spectral characteristics of the signals and of the optical devices employed;

FIG. 7 is a diagrammatic representation of a preferred embodiment of the detection system;

FIGS. 8 and 9 are diagrams of embodiments of optical filtering devices;

FIGS. 10 and 11 are diagrams of a second embodiment of the detection system;

Figure 1:
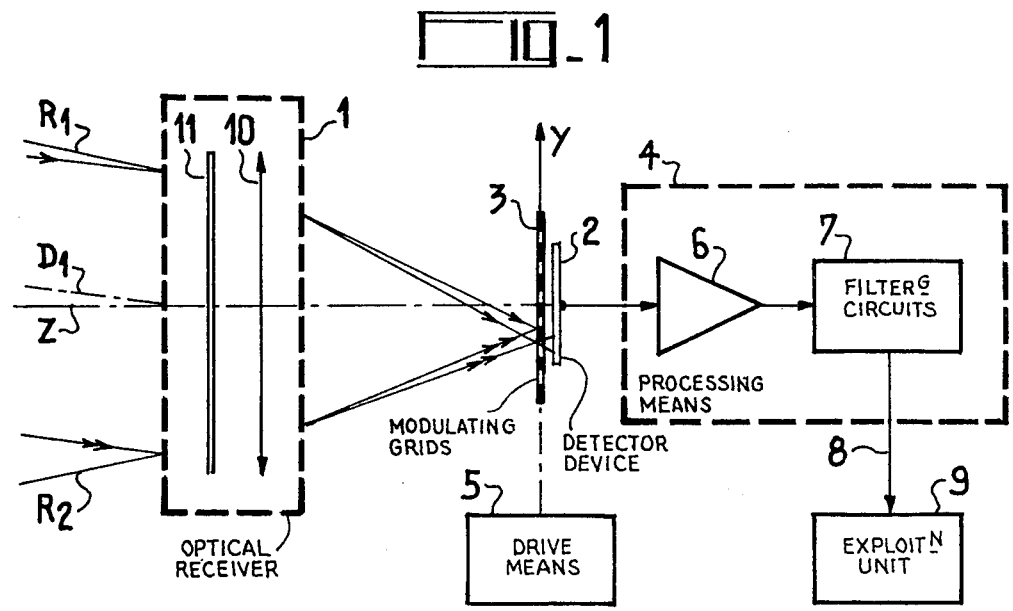
FIG. 1 is a block diagram of the radiant energy detection system.

The block diagram of FIG. 1 shows the principal components of a radian energy detection system of the presently concerned type, which comprises, in combination, an optical receiver arrangement 1, associated with a plane photodetector device 2, means for modulating the received radiation by means of grids 3, and means 4 for processing the modulated, detected signals.

Figure 2:
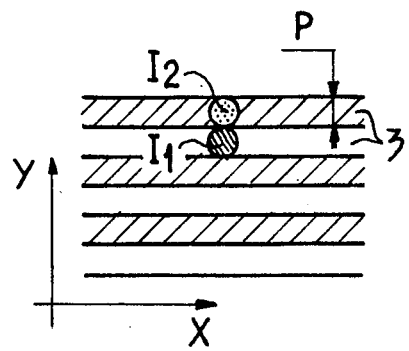
FIGS. 2 and 3 are diagrams of the spatial appearance at the plane of the grids of a useful signal and an interference signal respectively.
Figure 3:
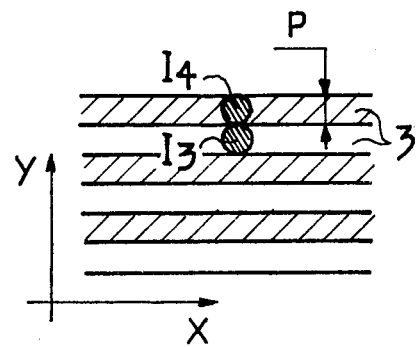

The operation of such a detection arrangement will now be described. The optical receiver 1 comprises an optical objective represented by the lens 10 and an optical filtering device repre sented by 11. The reception field is determined by the combination of optical receiver 10 and detector device 2; the rays at the boundaries of the field in the plane of the FIGURE being indicated by R1 and R2. The optical axis Z forms the sighting axis or axis of the observed field. The targets or objects situated in the field are generally sufficiently far away for the received radiation corresponding to them to be considered as parallel rays and the grids 3 are positioned substantially in the image focal plane of the objective 10 on which the incident light rays are focussed. Thus, the image of a radiating target which lies in the field in, for example, the direction D1 shown, is formed substantially in the plane of grids 3. The filtering device 11 consists of a selective optical filter whose waveband corresponds to thhe planned operating band, that is to say that of the radiation likely to arrive from the expected target or targets. The detection plane 2 is generally centered on the optical axis Z and parallely to the grids 3 and close thereto. The diameter of the image spot on plane 3 is in keeping with the dimensions of the opaque and transparent zones along the axis of traverse Y in order to obtain the desired modulation. For reasons for simplicity, it is assumed in what follows that the grids are formed by mutually parallel bands which lie next to one another along the traverse axis Y perpendicular to axis Z, but it should be understood that this configuration is not limiting. In this case, the width of the bands is P in direction Y and is calculated to be substantially equal to the diameter of the useful image. In FIGS. 2 and 3, the opaque and transparent bands are shown as alternating, thus producing the equivalent of sine-wave modulation. The dimension 2P in direction Y representing one opaque band followed by one transparent band (equivalent to one sine-wave cycle) is sometimes referred to as the pitch of the grids. It is understood that the bands may be differently distributed, in particular so as to produce modulation conforming to a pseudo-random code, in which case there may be a plurality of opaque or transparent bands of width P side-by-side in succession. The relative movement between the grids and the image is generally produced by moving the grids in the direction Y in which their plane lies by means of drive means shown at 5. Another possibility would be to swing axis Z in alternate directions by turning the optical receiver device 1 about an axis perpendicular to the plane of the FIGURE. The processing means 4, as shown, consist of amplification circuits 6 and filtering circuits 7. The filtering is matched to the modulation produced. The detector device 2 may consist of a plurality of detector means associated with one grid configuration or possibly one detector member associated with a plurality of grid configurations. The matched filtering may be effected by utilizing opto-electrical correlation techniques. The useful signal generated at 8 is transmitted to an operating unit 9 which is designed as a function of the intended application. Unit 9 may, for example, be produced with a view to display, angular location, or automatic tracking.

Figure 4:
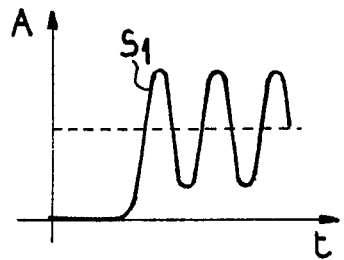
FIGS. 4 and 5 are waveforms for the detected signals having the configurations of FIGS. 2 and 3 respectively.
Figure 5:
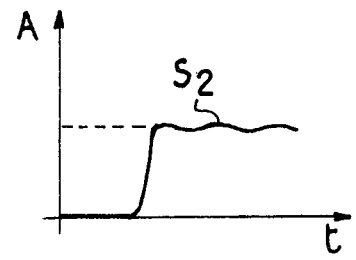

In accordance with the invention, the optical receiver arrangement 1, is especially designed to produce two images of the observed field which are staggered in the direction Y of the plane of the grids by an amount equal to the dimension P (i.e. half the pitch of the grids as defined above), the light intensity of these images being of predetermined levels depending upon whether or not they conform to the sought after radiation spectrum. FIGS. 2 and 3 show respectively the case of a useful image and an interference image of the same dimensions. The useful image I1 (FIG. 2) from a wanted target is duplicated by the optical arrangement 1, which forms a second image I2 of a low light intensity, so that the corresponding detected signal S1 (FIG. 4) is formed chiefly by that from image I1 when modulated by grids 3. In the case of interference radiation shown in FIG. 3, the image I3 is duplicated at I4 by the optical arrangement and these images are of substantially the same light intensity, with the result that the corresponding detected signal S2 (FIG. 5) is practically unmodulated. The radiant energy detection system is thus capable of discriminating between interference and useful images of the same spatial extent, i.e. of the same dimensional characteristics.

This result is achieved by undertaking optical filtering in both of the two optical channels which are created to obtain two images, one channel being termed the useful channel and the other channel the ancillary channel, and by causing a predetermined amount of attenuation to the radiation passing through the ancillary channel. The waveforms in FIG. 6 illustrate this method of operation. FIG. 6a shows the spectral spread SU of the sought after useful signals and that SP of the predominat interference radiation expected, such as solar radiation in the case of daytime operation. Waveforms 6b and 6c represent respectively the response curves C1 and C2 of the filters inserted in the two channels, the pass-band $d\lambda1$ of one is the intended operating waveband which corresponds to the useful spectrum SU centered on wavelength $\lambda1$, and the pass-band $d\lambda2$ of the other is centred on a wavelength $\lambda2$. Waveband $\lambda2$ is selected to be outside that $d\lambda1$ of the useful signal and to lie in a spectral area in which the useful signal contains practically no radiation. An attenuator device is inserted in the ancillary channel. The bandwidth $d\lambda2$ of the filter in the ancillary channel and the attenuation applied by the attenuator device are calculated to balance the light intensities in the ancillary channel and useful channel in the case of interference radiation of spectrum SP.

FIG. 7 shows a preferred embodiment of the radiant energy detection system. The means employed to effect the optical separation into two channels consist of a deflecting prism 15 inserted over part of the entry pupil of the optical arrangement. The part of the incident beam which impinges on the prism forms the ancillary channel; it is deflected by the prism and focused by objective 10 and has the required displacement F when it reaches the grids 3. The optical filtering device consists of a first filter 11a for the ancillary channel and second filter 11b for the useful channel whose passbands correspond to response curves C2 and C1 respectively. FIG. 8 shows these filters seen in the direction of axis Z, parts 11a and 11b being assembled and held together by any suitable means such as a surrounding mechanical support which is not shown. In the example shown, filter 11a covers half the entry pupil. In actual fact, the area covered may be greater or smaller, as is shown by the second example in FIG. 9, it being understood that the dimensions of the associated prism are altered accordingly. The attenuation means are formed by a glass plate 16 inserted along the ancillary channel which has on one face an optically dense layer 17 of predetermined opacity. Layer 17 may be obtained by deposition using known techniques. It could equally well be arranged on that one of the two major faces of prism 15 which is situated in the optical path and plate 16 could be dispensed with. The bandwidth $d\lambda2$ of the filter 11a in the ancillary channel is generally made suitably small. Consequently, the prism does not scatter the wavelengths in $d\lambda 2$ and only performs a deflecting function.

FIGS. 10 and 11 show a second embodiment of the radiant energy detection system. This contains two objectives 10a and 10b which are respectively associated with filters 11a and 11b. The ancillary channel consists of members 10a, 11a, a reflecting mirror 20 and dichroic mirror 21. The optical axis Z1 of the ancillary channel is parallel to that Z of the useful channel. The planes of mirros 20 and 21 are parallel and are inclined at 45° (FIG. 10) to the corresponding optical axes and are set up by means of a translatory movement along the optical axes in order to obtain the requisite stagger or shift P. Mirror 21 passes the useful radiation which arrives at a first face after passing through members 10b and 11b and reflects the interference radiation which arrives at its second face after passing through members 10a and 11a and being reflected from mirror 20. The arrangement shown in FIG. 11 is equivalent, the stagger being obtained by making the inclination of mirror 20 to axis Z1 different from that of mirror 21 to axis Z. The attenuation in the ancillary channel may be produced by means of an optically dense layer 17 (FIG. 11) as in the case OF FIG. 7, or by using a diaphram 22 (FIG. 10). The objectives 10a and 10b are such that, in association which detector 2, they cover the same field of reception.

Figure 12:
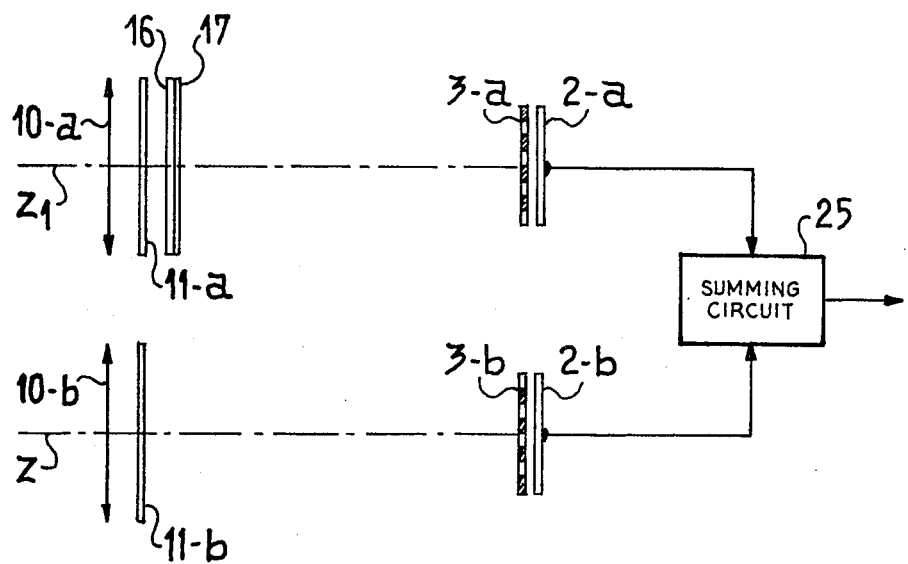
FIG. 12 is a diagram of a third embodiment of the detection system.
Figure 13:
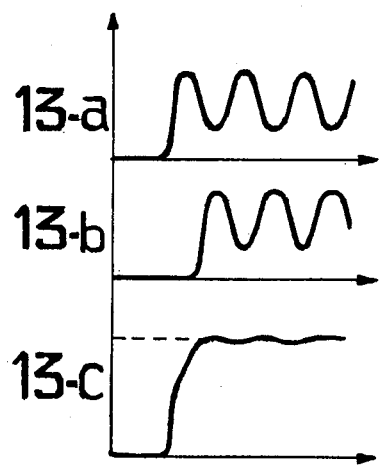
FIGS. 13 and 14 are wavefroms relating to the operation of the system of FIG. 12, and FIGS. 15 and 16 are diagrams relating to embodiments of modulating grids.
Figure 14:
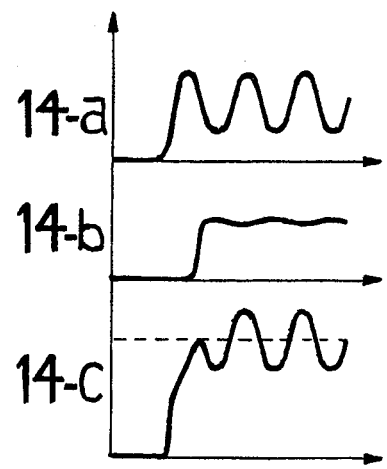

A third embodiment is shown in FIG. 12 and in this case two separate optical channels are produced. The detector device 2 and the grids 3 are duplicated but the precaution is taken of ensuring that there is a difference of setting equal to P between the grids 3a in the ancillary channel and those 3b in the useful channel. The detected signals are applied to a summing circuit 25. It is understood that where there are a plurality of detector members for each of the members 2a and 2b, there is a similar number of summing circuits. The manner of operation is illustrated by the curves in FIGS. 13 and 14, in the case of an interference signal and a useful signal respectively. Curves 13a and 14a represent the signal detected in the useful channel, curves 13b and 14b the detected signal in the ancillary channel and curves 13c and 14c the corresponding signal delivered from the output of summing circuit 25. It will be apparent that when the conditions of balance achieved by the attenuators 16, 17 are good, the modulation resulting from the staggered grids is virtually unchanged in the case of a useful signal and is virtually eliminated in the case of an interference signal as a result of the phase difference between 13a and 13b.

The grids 3 of the radiant energy detection system may be produced in a known manner, for example by means of optical tracks carried by a disc or a revolving drum. FIG. 15 shows, by way of example, a track 30 carried by a disc 31 which is driven with uniform rotation about its axis in a direction F. The staggered grids 3a and 3b may be produced in this case by selecting two detection zones 32 and 33 between which the desired stagger P exists. If, for example, track 30 represents a pseudo-random code which is repeated at least once in succession, the stagger between zones 32 and 33 will correspond, along the optical track, to one code-length plus the length P of one digit of the code.

It is understood that the different zones of the grids are not restricted to the band-form shown. As an example, FIG. 16 shows a configuration termed the chevron configuration which enables long interference signals to be distinguished from a useful signal, when they form an image 40 which is more elongated than that 41 from the useful signal in direction X but of the same size as that from the useful signal in direction Y.

It is also understood that the filters and the attenuator device may be positioned in the entry pupil as shown in FIG. 7 or possibly downstream of the corresponding objective (FIG. 11).

It may be noted that the basis for distinguishing interference radiation is the spectrum SP of the predominant radiation expected (FIG. 6a), that is to say the solar spectrum generally. Although this is an extremely rare event in practice, let it be assumed that there is an interference source which is radiating in a spectrum outside the band $d\lambda 2$ (FIG. 6a) but which covers the useful band $d\lambda 1$ and has the same dimensional characteristics as the useful image. Such an interference source meets the criteria which are applied in detecting a useful signal. To obviate the resultant mis-detection, the arrangement may be provided with additional filtering and attenuating means or the number of channels may be multiplied. As an example, a plurality of filters may be used to form the filtering arrangement in the ancillary channel, one of the filters having the characteristics illustrated in FIG. 6c and one or more of the others covering other parts of the wavelength spectrum. In a configuration of the type shown in FIG. 8 for example, the upper right-hand quadrant may represent a filter which filters a band $d\lambda 2$ (FIG. 6c) and the upper left-hand quadrant a filter which filters a band outside that $d\lambda 1$ of the useful signal which is centred on a wavelength higher than $\lambda 4$ (FIG. 6a).

Bearing in mind that the intended operating band $d\lambda 1$ is generally narrow and that the various sources of interference radiation which may be anticipated have fairly wide spectra, such additional provisions are not obligatory in practice.

Many modifications of the detection arrangement may thus be produced by duplicating, in accordance with the invention, the image of the observed scene, the two images being staggered by a predetermined amount in the direction of tranverse, and by balancing the light energy levels for an expected type of interference radiation, that is to say on whose dimensional characteristics are similar to those of the useful image in the direction of tranverse and whose spectral spread covers the selective bands of both of the two optical channels which are created.

What is claimed is:

1. In a radiant energy system for discriminating between radiation from a target and ambient radiation, the combination of: optical receiver means comprising an optical objective for focusing the said radiation originating from an observed field, an optical splitter device for producing two optical channels, a first optical filter in a first of said channels having a pass-band corresponding substantially to the said target radiation spectrum, a second optical filter in the second of said channels having a pass-band corresponding to a portion of the said ambient radiation spectrum and outside the target spectrum and optical attenuating means for balancing the ambient radiation levels in the two channels; reticle means for modulating the focused radiation by means of grids comprising, in a plane, transparent zones separated by opaque zones said grids being moved substantially in the focal plane of said optical objective in a direction transverse to that of the optical axis of said objective; photodetection means behind said reticle means for detecting the modulated and filtered radiation and a circuit for processing the detected signals; the said optical splitter device producing in combination with said objective two images of the said field, one for each channel, which are staggered in the plane of the grids in the said direction by an amount substantially equal to the diameter of the target image, the dimension of the said zones in this direction being a multiple of and at least equal to this diameter.

2. A detection system according to claim 1, wherein the said optical splitter device comprises a deflecting prism intercepting a portion of the received radiation to produce a deflected beam representing the said second optical channel, and wherein further the photodetection means consists of a plane photodetector device.

3. A detection system according to claim 1, wherein the assembly formed by the optical objective and the optical splitter device comprises two optical lenses to produce two parallel channels, a plane reflecting mirror inserted in the second channel, and a plane dichroic mirror inserted in the first channel which is substantially parallel to the said plane reflecting mirror.

4. A modified embodiment of a detection system according to claim 1, wherein the assembly of said optical objective and said optical splitter device comprises two optical objectives to produce two parallel channels, each optical objective being associated with a plane of grids and with a detector device, the said planes of grids being staggered relative to one another by an amount corresponding substantially to the said diameter, the said detectors being connected to a summing circuit.

5. A detection system according to claim 1, wherein the said attenauting means comprises an optically dense layer of predetermined opacity inserted in the second optical channel.

6. A detection system according to claim 5, wherein the said optically dense layer is applied to a plate of transparent material.

7. A detection system according to claim 2, wherein the said attenuating means comprises an optically dense layer of predetermined opacity applied to a face of the deflecting prism.

8. A detection system according to claim 7, wherein the said first and second filters each cover a separate part of the entry pupil of the said optical objective.

9. A detection system according to claim 8, wherein the said grids are formed by bands which lie next to one another in the said traverse direction to provide at least one optical modulating track.

* * * * *